W. S. BROOKS.
RESILIENT TIRE FOR VEHICLE WHEELS.
APPLICATION FILED FEB. 5, 1912.
1,058,030.
Patented Apr. 8, 1913.
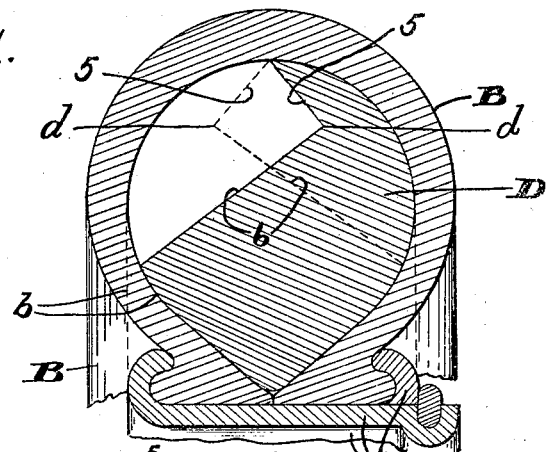
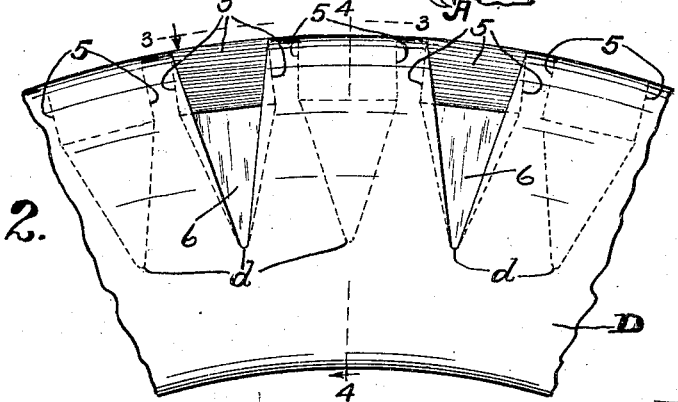
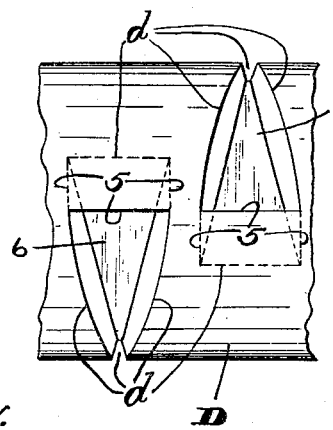
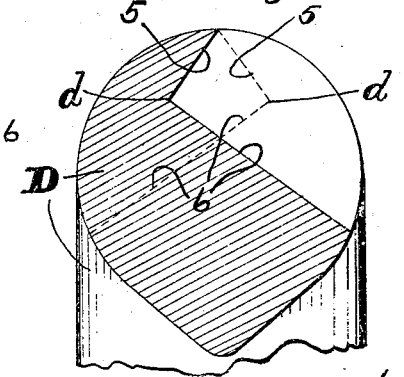
Witnesses:
H. J. Gittins.
N. L. McDonnell.
Inventor
William S. Brooks
By
his Attorneys

UNITED STATES PATENT OFFICE.

WILLIAM S. BROOKS, OF AKRON, OHIO, ASSIGNOR OF FIFTEEN THIRTY-SECONDS TO FREDERICK V. ROESEL AND FIFTEEN THIRTY-SECONDS TO GEORGE E. GILMORE, BOTH OF AKRON, OHIO.

RESILIENT TIRE FOR VEHICLE-WHEELS.

1,058,030.  Specification of Letters Patent.  Patented Apr. 8, 1913.

Application filed February 5, 1912. Serial No. 675,434.

*To all whom it may concern:*

Be it known that I, WILLIAM S. BROOKS, a citizen of the United States of America, residing at Akron, in the county of Summit and State of Ohio, have invented certain new and useful Improvements in Resilient Tires for Vehicle-Wheels; and I hereby declare the following to be a full, clear, and exact description of the invention, such as will enable others skilled in the art to which it pertains to make and use the same.

This invention relates to improvements in resilient tires for vehicle-wheels, and pertains more especially to an elastic and compressible tire comprising the following:—a flexible outer casing adapted to be applied to an annular tire-holder and provided interiorly with a chamber arranged to extend circumferentially of said tire-holder, and a flexible core which is arranged within said chamber and composed of elastic and compressible material and provided with recesses spaced circumferentially and extending transversely of the core.

The object of this invention is to produce a resilient wheel-tire of the character indicated which possesses great resiliency and much greater durability than a pneumatic tire.

This invention consists more especially in the production, as a part of a tire of the character indicated, of a core so improved in contour as to render said core highly resilient without materially weakening the core.

In the accompanying drawings, Figure 1 is a cross-sectional view of a tire embodying my invention, which figure shows the tire applied to a tire-holder. Fig. 2 is a side view of a portion of my improved core of the tire. Fig. 3 is a view taken along the line 3—3, Fig. 2, looking inwardly. Fig. 4 is a vertical section on line 4—4, Fig. 2, looking in the direction indicated by the arrow.

Referring to said drawings, A, Fig. 1, indicates a tire-holder which of course is made annular to render it capable of being mounted on a wheel-rim (not shown), and B represents the hollow casing of my improved tire, which casing is substantially the same as the casing of an ordinary pneumatic tire. The tire-holder A is applied in any approved manner, and the casing B is composed of flexible and elastic material such, for instance, as rubber. The casing B extends of course circumferentially of the tire-holder A and is provided interiorly with a chamber $b$ extending circumferentially of said tire-holder.

Within the hollow casing B is a flexible core D arranged within the chamber $b$ and extending circumferentially of the tire-holder A. Said core is shown composed of a single solid piece of elastic and compressible material such, for instance as rubber. Said core is provided with recesses $d$ which are spaced circumferentially and extend transversely of the core. Alternate recesses $d$ are shown staggered and extend at the exterior of the core from the central portion of the outer circumferential surface of the core laterally in opposite directions, and each recess at said portion of said surface has a straight end wall 5 which is undercut and substantially uniform in width from top to bottom of the wall. The end wall 5 of each recess $d$ is arranged substantially at a right angle to the bottom 6 of the recess, which bottom extends therefore substantially straight between the ends of the recess and preferably farther from a point centrally of the outer circumferential surface of the core in the direction of one side of the core than in the direction of the other side of the core. It will be observed therefore that each recess $d$ is widest at its end wall 5,—that is, at its end which is arranged centrally of the outer circumferential surface of the core,—and from said wall or end is gradually reduced in width at the exterior of the core toward the opposite end of the recess, and the bottom of said recess is gradually reduced in width toward the last-mentioned end of the recess from said wall. It will be observed therefore that in my improved core for a resilient tire of the character indicated the recesses extend from the circumferential surface of the core laterally and have undercut end walls at said surface. The provision of the undercut end wall of each recess at said surface is important in rendering the tire highly resilient, and to obtain the greatest resiliency possible said undercut end wall is substantially uniform in width from top to bottom. To avoid flabbiness in any portion of the core and to avoid unduly weakening the core said recess has a bottom arranged between and at an angle to opposite side walls of the recess and also gradually reduced in width toward the last-mentioned end of the recess. I would also remark that the staggered relation of the special recesses hereinbefore described renders possible the location of the undercut end wall of each recess at the central portion of the circumferential surface of the core and assists generally in the results to be attained by said recesses. That is, a core provided with recesses having the peculiarities hereinbefore described and having alternate recesses staggered is superior to a core having similar recesses without the staggered relation.

I would have it understood that to attain the maximum resiliency in the core hereinbefore described it is important not only to have each recess formed and arranged so that it extends transversely of the core and has an end wall adjacent the outer circumferential surface of the core, and that said wall is undercut and substantially uniform in width from top to bottom but to have said recess substantially as wide at the bottom as at the top thereof from end to end of the recess, and to have said recess and its bottom wide enough at said wall. However to prevent the core from being unduly flabby and to have the core strong enough at the open end of the recess it is not unimportant to have said recess and its bottom reduced in width in the direction in which said wall of the recess faces.

What I claim is:—

1. In a resilient tire for a vehicle-wheel, the combination, with a flexible outer casing adapted to be applied to and extend circumferentially of an annular tire-holder, which casing is provided interiorly with a chamber arranged to extend circumferentially of said tire-holder, of a flexible core occupying said chamber and composed of elastic and compressible material and having recesses spaced circumferentially of the core, alternate recesses being staggered and extending at the exterior of the core from the outer circumferential surface of the core laterally in opposite directions respectively and transversely of opposite sides, each recess at its end which is arranged centrally of said surface having an end wall which is undercut and substantially uniform in width from top to bottom of the wall, and the bottom of said recess being widest at the aforesaid end of the recess and reduced in width toward the opposite end of the recess.

2. A flexible core for a resilient wheel-tire, which core is composed of elastic and compressible material and has recesses in each side of the core, which recesses are spaced circumferentially of the core and extend at the exterior of the core from the outer circumferential surface of the core laterally, said recesses at their ends which are arranged at said surface having end walls which are undercut and substantially uniform in width from top to bottom and also having bottoms reduced in width toward the opposite ends of the recesses.

3. A flexible core for the interior of a resilient wheel-tire, which core is composed of elastic and compressible material and has recesses in each side of the core, which recesses are spaced circumferentially and extend transversely of the core, each recess having an end wall adjacent the outer circumferential surface of the core and being substantially as wide at the bottom as at the top from end to end thereof, said recess and its bottom being reduced in width in the direction in which said wall faces.

In testimony whereof, I sign the foregoing specification, in the presence of two witnesses.

WILLIAM S. BROOKS.

Witnesses:
B. C. BROWN,
N. L. MCDONNELL.